United States Patent [19]

Siems

[11] 4,005,273

[45] Jan. 25, 1977

[54] MULTIPLEXER OFFSET REMOVAL CIRCUIT

[75] Inventor: Lee E. Siems, Houston, Tex.

[73] Assignee: Western Geophysical Company of America, Houston, Tex.

[22] Filed: Mar. 8, 1976

[21] Appl. No.: 664,615

[52] U.S. Cl. .................. 179/15 BL; 340/147 CN; 340/151; 340/177 CA; 340/183
[51] Int. Cl.² .......................................... H04J 3/04
[58] Field of Search .................. 179/15 A, 15 BL; 340/147 CN, 151, 177 CA, 183; 324/1

[56] References Cited

UNITED STATES PATENTS

| | | | |
|---|---|---|---|
| 3,059,228 | 10/1962 | Beck | 179/15 BL |
| 3,740,481 | 6/1973 | Lee | 179/15 BL |
| 3,819,864 | 6/1974 | Carroll | 179/15 BL |
| 3,911,226 | 10/1975 | Angelle | 179/15 BL |

Primary Examiner—David L. Stewart
Attorney, Agent, or Firm—William A. Knox; Alan C. Rose

[57] ABSTRACT

In a multi-channel multiplexed system, each signal-receiving input channel has a DC blocking capacitor. One of the input channels to the multiplexer is grounded making this channel a test channel. A signal-conditioner-and-amplifier network (SCAN) couples the multiplexer output to a utilization device. The spurious voltage developed across the capacitor in the test channel combined with the offset voltage across the SCAN will be substantially the same as each one of the spurious voltages developed across the capacitors in the other input channels in combination with the SCAN offset voltage. A sample-and-hold circuit consisting of a series capacitor and a normally ungrounded shunt switch is connected between the output of the SCAN and the input to the utilization device. Periodically, as during each scan cycle of the multiplexer, the capacitor in the sample-and-hold circuit will be charged to and hold a sample voltage having equal amplitude but opposite polarity to the spurious voltage developed across the test channel capacitor in combination with the SCAN.

8 Claims, 3 Drawing Figures

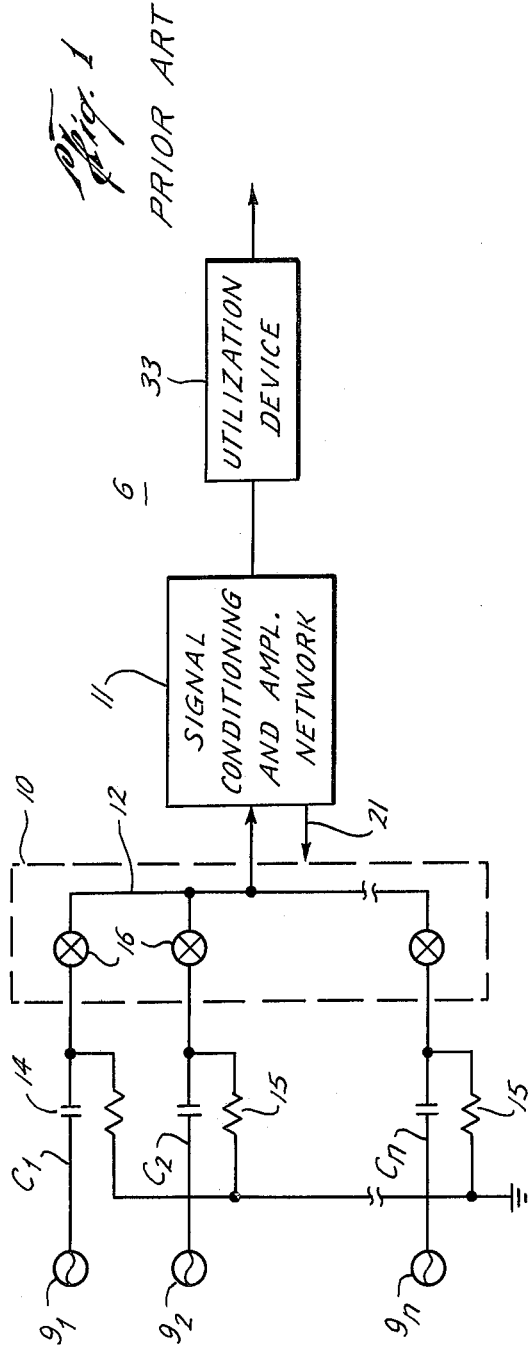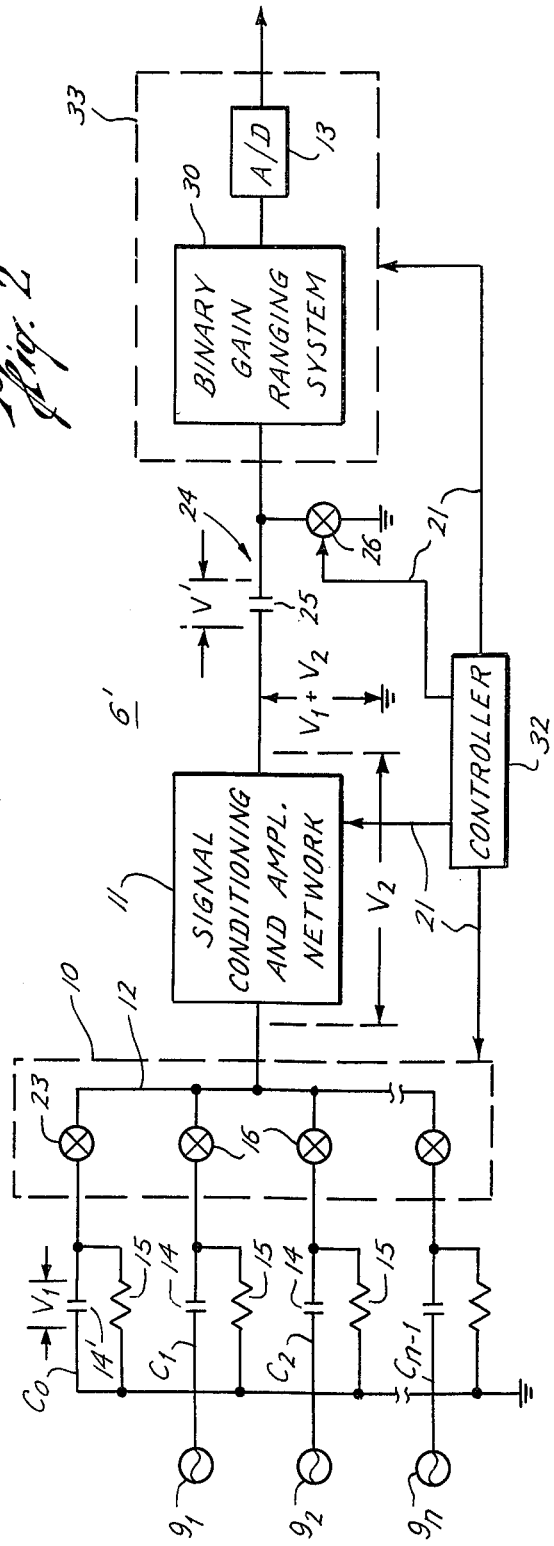

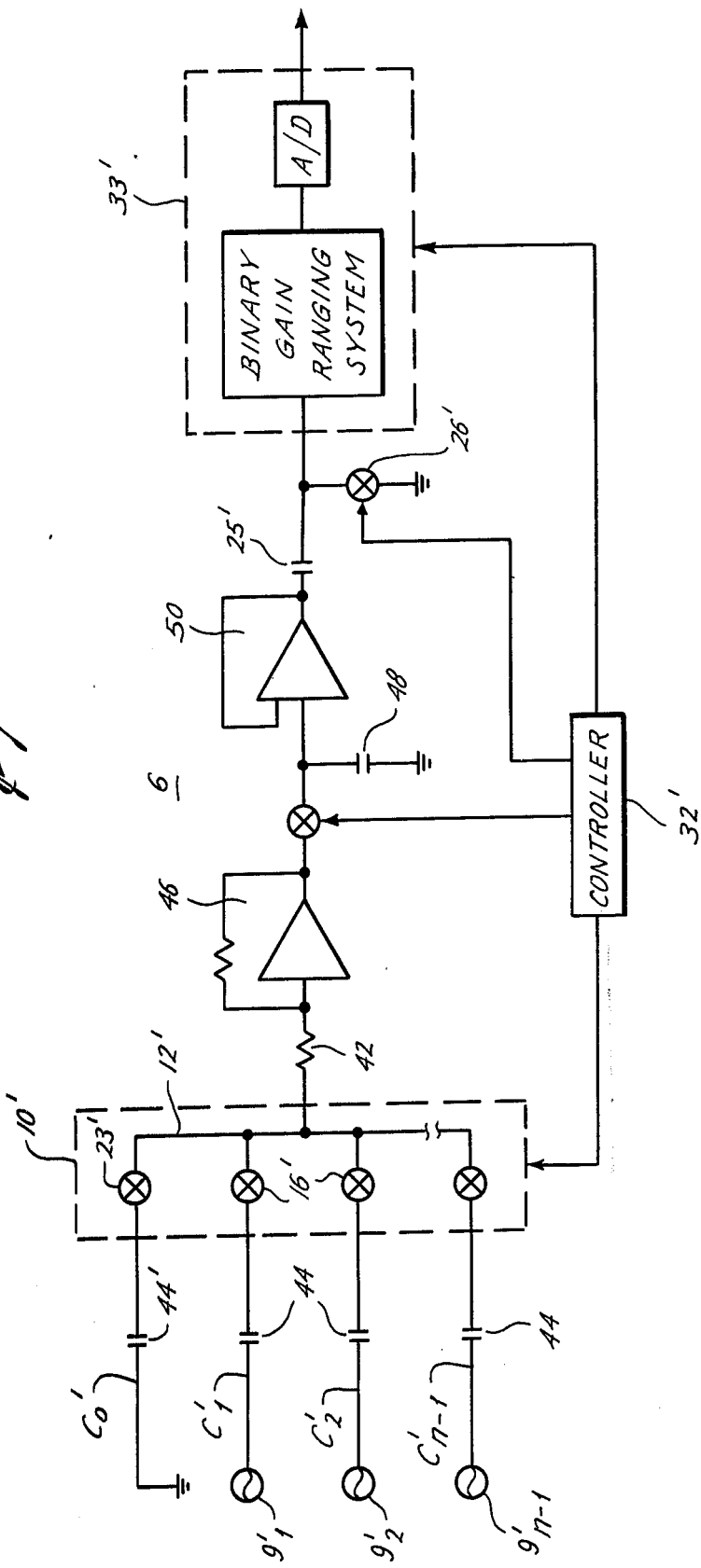

MULTIPLEXER OFFSET REMOVAL CIRCUIT

BACKGROUND OF THE INVENTION

RELATION TO OTHER APPLICATIONS

This application forms part of a group of patent applications filed concurrently, having the following attorney's docket numbers, serial number, titles, and inventors:

SEISMIC METHOD AND SYSTEM OF IMPROVED RESOLUTION AND DISCRIMINATION — C. H. Savit. Ser. No. 665,150

MULTIPLEXER-COMMUTATED HIGH PASS FILTER — Lee E. Siems, Ser. No. 664,614

GAIN RANGING AMPLIFIER SYSTEM — George Mioduski. Ser. No. 664,616

SEISMIC DATA TELEMETER SYSTEM — Lee E. Siems, Paul M. Morgan. Ser. No. 664,151

DECENTRALIZED SEISMIC DATA PROCESSING SYSTEM — Lee E. Siems et al. Ser. No. 664,618

MULTICHANNEL SEISMIC TELEMETER SYSTEM AND ARRAY FORMER — Lee E. Siems et al. Ser. No. 664,617

FIELD OF THE INVENTION

This invention relates in general to analog signal data acquisition systems wherein a plurality of signal-receiving channels are multiplexed and the amplitudes of the sampled signals converted to digital words. The invention has particular utility to seismic analog-to-digital data acquisition systems.

REFERENCE TO RELATED ART

In a conventional, multi-channel, analog-to-digital conversion system, use is made of a multiplexer having a plurality of input terminals and a common output bus. Each input terminal to the multiplexer is connected to receive the output signal of an analog device such as a seismic sensor. Frequently, as in the seismic art, it is desired to eliminate the DC component of the analog signals received by each multiplexer channel. Therefore, a DC blocking capacitor is typically connected between each input terminal to the multiplexer and the analog device. The multiplexer bus is connected to a SCAN which samples the signals, conditions and amplifies the sampled signals.

For reasons which are well known to those skilled in the art, spurious voltages are developed across the DC blocking capacitors and the SCAN. The spurious voltages can be attributed to thermoelectric effects, Peltier effects, offset drifts in the amplifier stages, FET switches having feedthrough capacitors and leakage resistors between their control and switching elements, etc. The spurious voltage problem is particularly acute in the seismic art because the incoming analog signals have an extremely wide dynamic range, say up to 120 dB (1:1,000,000). Quite frequently, the spurious voltage is of a magnitude comparable to the detected seismic signals.

SUMMARY OF THE INVENTION

A typical prior-art multi-channel, seismic system comprises a plurality of channels, each being adapted to receive analog signals from seismic detectors. A multiplexer multiplexes the analog channels prior to converting the channels' signals into digital numbers. Each channel has a DC blocking capacitor connected to one terminal of a normally-open multiplexer switch; the other terminal of the switch is connected to a multiplexer output bus. The bus is connected to a signal-conditioner-and-amplifier network (SCAN) which includes control means for consecutively closing the multiplexer switches. The capacitor whose switch has been closed will transmit the spurious voltage thereacross through the SCAN to a utilization device, typically an analog-to-digital converter.

In accordance with the present invention, the blocking capacitor of one of input channels to the multiplexer is grounded making this channel a test channel. The spurious voltage developed across the capacitor in the test channel will be substantially the same as each one of the spurious voltages developed across the capacitors in the signal-receiving multiplexer channels because all of the capacitors and switches are substantially identical. A sample-and-hold (S/H) network consisting of a series capacitor and a normally ungrounded shunt switch is connected between the output of the SCAN and the input to the utilization device. Periodically, as during each scan cycle of the multiplexer, the charge in the blocking capacitor in the test channel will be transferred to the series capacitor in the S/H circuit but with opposite polarity and preferably of equal amplitude as a sample voltage. Each spurious voltage from each signal-receiving channel will be added successively and algebraically to the sample voltage and therefore, substantially cancelled by the sample voltage.

BRIEF DESCRIPTION OF THE DRAWINGS

For a better understanding of this invention, reference may now be made to the drawings wherein:

FIG. 1 is a simplified schematic block diagram representation of a typical prior art digital processing system; and FIG. 2 is a simplified schematic block diagram representation of the system of this invention.

FIG. 3 is a schematic block diagram of a system similar to the system of FIG. 2, but with modified input circuitry.

DETAILED DESCRIPTION OF A PREFERRED EMBODIMENT

For a better understanding of the present invention, reference is made to FIG. 1 wherein is shown a typical prior art digital data acquisition system 6 having a multiplexer 10 connected to a plurality of receiving channels $C_1, C_2, \ldots, C_n$, all connected to the multiplexer bus 12 through DC blocking capacitors 14, resistors 15, and switches 16. The signal receiving channels are coupled to seismic sensors $9_1, 9_2, 9_n$. Each resistor 15 in combination with its capacitor 14 forms a high-pass RC filter for its channel. The filter removes the DC components of the incoming analog signals. Switches 16 are high-speed FET switches of any well-known type.

The output of multiplexer bus 12 is typically connected to a signal-conditioner-and-amplifier network (SCAN) 11 which conditions and suitably amplifies the sampled analog signals prior to applying them to a utilization device 33. SCAN network may include a fixed-gain buffer amplifier, sample-and-hold circuitry and other circuits for preconditioning a signal sample before transmittal to utilization device 33. The internally-generated spurious noise in multiplexer 10 will appear across each capacitor 14 as a spurious voltage $V_i$ which can be of either polarity with respect to ground, and the internally-generated spurious noise voltage $V_2$ across the SCAN 11 will appear on its output and become algebraically added to $V_1$. When the voltage amplitudes of the incoming desired signals become comparable to the spurious voltages $V_1 + V_2$, then the noise-to-signal ratio will be excessive. In the seismic art, a trace which is excessively noisy is frequently discarded, thereby wasting valuable seismic information.

The spurious voltages $V_1 + V_2$ have many origins including: thermoelectric effects, Peltier effects, offset drifts of the amplifier stages in SCAN 11, etc. The FET switches 16 employed in multiplexer 10 induce a noise voltage $V_1$ across capacitor 14. Being semi-conductor devices, it is well known that FET switches include equivalent feedthrough capacitors and leakage resistors between their control and switching elements (not shown). Moreover, each control element in each FET switch is activated by a relatively large control pulse provided by the SCAN to a control line 21. This control pulse will pass onto each DC blocking capacitor 14 through the feedthrough capacitor and leakage resistor of its associated FET switch 16.

The capacitors 14 are identical and the equivalent feedthrough capacitors and leakage resistors of the FET switches are substantially identical, therefore the spurious voltages across capacitors 14 are uniform.

Referring to FIG. 2, in accordance with this invention, one of the input channels to the multiplexer 10 is grounded. This channel herein referred to as $C_0$ or the "test" channel is in all respects similar to the signal-receiving input multiplexer channels $C_1$-$C_{n-1}$, where $n$ is the number of channels, except that the input terminal to channel $C_0$ is connected to ground G so that no external signals can be applied to the test channel $C_0$. The test channel includes a capacitor 14' which has the same capacitance value as capacitors 14. Associated with capacitor 14' is a multiplexer switch 23.

Between SCAN 11 and the utilization device 33 is connected a sample-and-hold (S/H) network 24 comprising a series capacitor 25 and a normally-open, shunt FET switch 26 connected to ground.

The output of multiplexer bus 12 is connected to SCAN 11 which typically for a seismic system, includes a unity-gain amplifier whose output is connected to a signal sample-and-hold circuit (not shown).

A state controller 32 controls all the operative networks of system 6' through control lines 21. For example, controller 32 sequences the multiplexer channels $C_0$-$C_{n-1}$ through a multiplexer scan cycle, and controls signal utilization device 33 which typically in a seismic system, includes a binary-gain-ranging amplifier 30 coupled to an analog-to-digital (A/D) converter 13.

Converter 13 converts the multiplexed analog signals from channels $C_1$-$C_{n-1}$ into corresponding digital numbers. Other networks which are not germane to this invention have been purposely omitted from FIG. 2 for the sake of clarity.

In operation of system 6' shown in FIG. 2, at the start of a multiplexer scan cycle, multiplexer 10 is reset to test channel $C_0$ at which time switches 23 and 26 will be closed. The spurious voltage $V_1$ developed across capacitor 14' will become algebraically added to the spurious voltage $V_2$ developed across SCAN 11. The thusly combined voltage $V_1 + V_2$ will be transferred to capacitor 25 to develop thereacross a sample voltage $V'$ which when switch 26 is open will be in opposite polarity to $V_1 + V_2$. Thus, each time that the multiplexer is reset to test channel $C_0$, the S/H network 24 acquires the spurious voltages from the test channel $C_0$ and SCAN 11. Thereafter, switches 23 and 26 will remain open while multiplexer 10 sequentially scans the active, signal-receiving channels $C_1, C_2, \ldots, C_{n-1}$.

If capacitors 14' and 14 have the same capacitance values and if the overall gain of the SCAN 11 remains constant, then $V' = V_1 + V_2$. Therefore, as multiplexer 10 scans channels $C_1$-$C_{n-1}$, each channel will have at the output of SCAN 11 a signal voltage $V_{c_n}$ as well as spurious noise voltage $V_1 + V_2$ which will be successively and algebraically added to the sample voltage $V'$ held by capacitor 25 in accordance with the following equation:

$$V_{c_n} + V_1 + V_2 + (-V') = V_{c_n}$$

so that each spurious voltage $V_1 + V_2$ from each signal-receiving channel will be substantially cancelled by the sample voltage $V'$.

FIG. 3 shows the principles of the present invention as applied to the improved circuit shown and described in the above referenced Patent Application Ser. No. 664,614, entitled "A Multiplexer-Commutated "High-Pass Filter" (LRS 120).

In FIG. 3, the circuit is shown with primed reference numerals employed on components performing substantially the same function as in FIG. 2 of the present drawings.

In FIG. 3 the single resistor 42 is employed in place of the individual resistors 15 in FIG. 2. Further, for the reasons set forth in the specification cited immediately above (LRS 120), the capacitors 44 and 44' are of substantially lesser capacitance than the capacitors 14 and 14' of FIG. 2. Accordingly, a given current leakage (from switch/6 or/6' for example), would develop a larger voltage across capacitors 44 and 44' of FIG. 3 than across the larger capacitors 14 and 14' of FIG. 2.

In FIG. 3, other circuit elements not identical with those of FIG. 2 include multiplexer buffer amplifier 46, the signal sample and hold capacitor 48, and the buffer amplifier 50. Apart from these minor circuit differences, the foregoing description of FIG. 2 is fully applicable to FIG. 3, and the compensating voltage is developed across capacitor 25' to compensate for the spurious voltages appearing on capacitors 44.

The above specification has been described in the light of one illustrative embodiment. It should be understood that minor departures from the structure and circuitry may be made without departing from the scope of the specification.

What is claimed is:

1. An analog-to-digital signal acquisition system comprising:
   a plurality of input channels;
   a multiplexer having a plurality of inputs and a common output bus;
   a capacitor connected between each of said input channels and one of said multiplexer inputs, each said capacitor having a spurious voltage developed thereacross;
   means for connecting one of said input channels to ground;
   circuit means including an amplifier for connecting said multiplexer bus to a utilization device; and
   a sample-and-hold circuit connected between said circuit means and said utilization device, said sample-and-hold circuit means comprising a shunt switch and a series capacitor for developing a sample voltage thereacross equal and of opposite polarity to said spurious voltage each time that the grounded input channel is scanned by said multiplexer and said shunt switch is closed, whereby in use, the sample voltage will successively cancel out the spurious voltages from said signal-receiving channels, as the multiplexer scans the signal-receiving channels.

2. The system of claim 1 wherein the capacitor in the grounded input channel and the capacitors in the other input channels have the same capacitance value.

3. The system as defined in claim 1 wherein said utilization circuit is a binary gain ranging amplifier.

4. The system as defined in claim 1 wherein said circuit means includes a buffer amplifier.

5. The system as defined in claim 1 wherein said circuit means is a signal conditioning and amplifying network.

6. The system as defined in claim 1 wherein means for applying analog signals having a wide dynamic range are connected to all of said input channels except said one input channel.

7. The system as defined in claim 1 wherein seismic sensors are connected to all of said input channels except said one input channel.

8. The system as defined in claim 1 wherein said system includes controller circuit means for concurrently connecting said one grounded input circuit to said multiplexer and for closing said shunt switch to ground the output of said series capacitor.

* * * * *